Feb. 10, 1942.   L. L. DE KRAMOLIN   2,272,794
APPARATUS FOR PRODUCING HIGH TENSION DIRECT CURRENT
Filed June 27, 1939
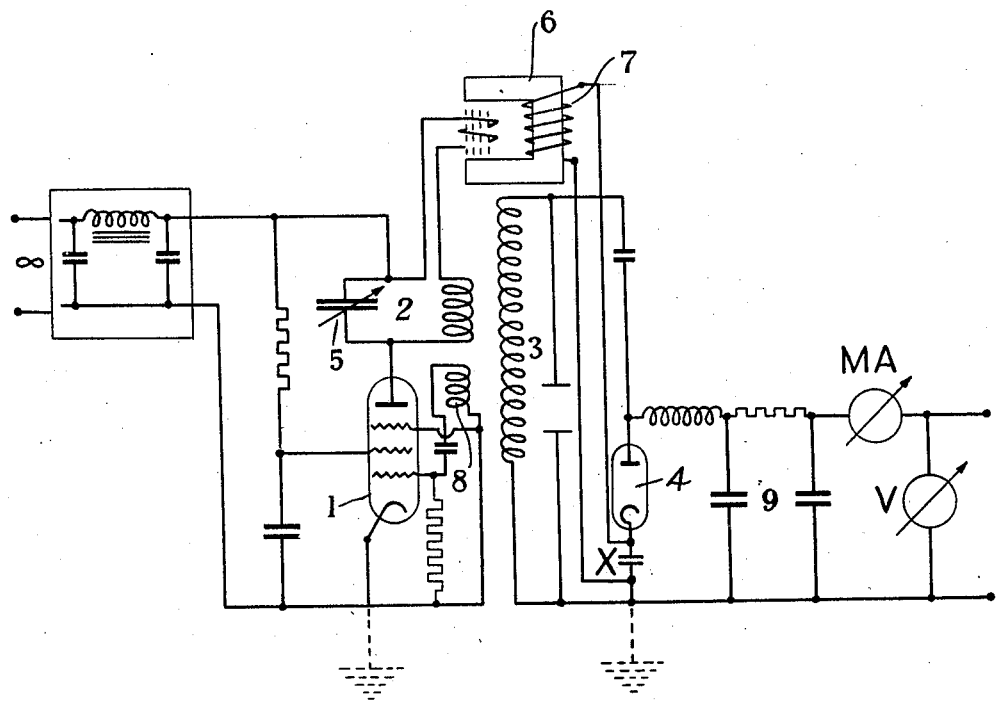
INVENTOR
Leon Ladislas de Kramolin Patented Feb. 10, 1942

2,272,794

UNITED STATES PATENT OFFICE 2,272,794

APPARATUS FOR PRODUCING HIGH TENSION DIRECT CURRENT

Leon Ladislas de Kramolin, Berlin-Kladow, Germany

Application June 27, 1939, Serial No. 281,312
In Germany July 6, 1938

12 Claims. (Cl. 175—363)

For the purpose of testing the efficiency of the insulation of conductors and cables, and of testing insulators, it is generally necessary to use fairly high voltages. In this connection at the high testing voltages used it is generally desirable to employ direct current having very slight preparations, since with the use of alternating current or direct current of pronounced pulsation the angle of loss of the insulating materials to be tested is apt to give rise to errors in the test result. For this purpose there have hitherto been frequently used crank indicators, pendulum interruptors, and standard alternating current transformers which generally speaking are operated with technical alternating current from mains, the voltage being then transformed up to the requisite value, particularly in the last-mentioned cases, by a transforming step.

Since the high tension current should have only slight pulsation it is necessary however to provide fairly expensive smoothing means on the high tension side, for the purpose of bringing the pulsation down to the slight degree requisite for exact measurement. Furthermore, it is generally necessary for the same reason with the usual frequencies, to work with full-wave rectification, since half-wave rectification considerably increases the pulsation and thus adds still further to the requirement in the matter of smoothing means.

When testing voltages selected from a range extending from relatively few volts to several hundred volts are used, the technical means required are not excesively bulky or expensive with the types of apparatus hitherto known. When however testing currents of upwards of several thousand volts are to be used, as is necessary more particularly in testing insulators, the means required are very bulky and expensive, since even with low outputs the transformers become expensive and bulky owing to the heavy insulation, and the same applies to the smoothing means. Very considerable difficulty is thus encountered, particularly in designing portable sets.

According to the present invention this difficulty is overcome by using an alternating current of medium-high, high or extremely high frequency of the order of the range of radio frequencies in contradistinction to audio or power frequencies, as the intermediate stage of the transformation. Since it is sufficient for the purposes concerned if the high tension direct current only has a low output of a few watts, an inexpensive standard valve such as is used for radio purposes will suffice as high frequency generator.

The embodiment illustrated in the accompanying drawing represents apparatus of this kind in which as generator tube 1 there is used a five electrode valve of the type of the Telefunken valves AL4 and AL5. The set, which in this case takes the form of a unit for direct connection to a main, may also be fed from a battery if it is desired in particular cases to make the set independent of a mains supply, in which case it may then be desirable to employ double grid valves, say space charge grid valves, in order that low battery voltages may suffice to provide the anode potential and in order that accumulators may be employed for this purpose. The set consists essentially of a back-coupled oscillation generator which may work in the present case at a frequency of say 300 kc.

If in particular cases this frequency lying within the broadcasting range should happen to give rise to trouble, a lower or higher frequency lying just outside the broadcasting range may be employed, and it is also possible by employing appropriate screening means for the high frequency portion, to provide practical freedom from interference.

The high frequency oscillations are produced by back-coupling the anode circuit 2 with the grid circuit 8 of the valve 1. The high tension high frequency current is generated by coupling with the anode circuit 2 of the generator (which has a ratio of capacity to self-induction favourable to the valve used) a secondary circuit 3 having very high self-induction and very small capacity (if desired there may be employed for the tuning merely the inherent capacity of the secondary winding together with the capacity of the switching elements connected therewith).

This high frequency secondary voltage is rectified, and that preferably in a half-wave rectifier 4 connected in parallel to the secondary high frequency circuit. Also series connection of a rectifier gives, generally speaking, greater efficiency. In the present instance the rectifier is connected in parallel for the reason that it thereby becomes possible to keep the rectifier heating winding or other rectifier current sources at a low potential, and thereby to do away with the necessity for particularly high quality insulation of these current sources, since the cathode side, as indicated by dotted lines, can be earthed in the majority of cases met with in practice.

Since high frequency current is being used, extremely simple and inexpensive smoothing means (such as the smoothing circuit 9), and possibly even the inherent capacity of the consumers, will suffice to smooth out pulsations occurring even with half-wave rectification, so that in this way also the set is very greatly simplified and cheapened.

Since the high tension coil can generally be made with one layer or at least with very few layers, so that a simple glass tube will suffice as the coil former, or a simple tube in which small recesses are provided for accommodating individual groups of windings, as is known in connection with the construction of high frequency choke coils, the high tension parts may be made extremely simple and inexpensive and no difficulties of design are encountered, in contrast to the expensive low frequency high voltage transformers.

The voltage regulation in a set of this kind may be effected by virtue of the possibility of varying either the frequency or the phase or the amplitude of the high frequency oscillations, even during operation of the set, whereby a perfectly continuous and steady voltage regulation is obtainable.

In the embodiment shown in the drawing the regulation is effected by operation of the anode circuit tuning condenser 5 of the oscillator valve.

If the regulation is to be by amplitude variation, which may be effected for instance by varying the feed voltage of the oscillator valve on the low tension side, the drawback is apt to be encountered that oscillating breaks off at low values of the feed voltage.

To overcome this drawback it is advisable, in connection with all arrangements serving for direct current transformation, particularly for the generation of high tension direct currents, to operate the high frequency generator with a separate control valve, that is to say for example to employ no back-coupling current generator for the energy supply proper.

The oscillation producing tube then works with constant anode voltage and only the high frequency amplifier valve supplying the useful current is fed with an anode voltage that can be varied at will.

Since it may be desirable to arrange for the normally adjusted testing voltage to be maintained approximately undiminished even with defective insulation, that is to say, to guard against excessive initial voltage drop owing to the output consumption in the insulating material when the insulation is defective, which may easily occur with the essentially slight high tension output available, it is advisable to provide a positively effected voltage regulation independently of voltage regulation which is adjustable at will, that is to say possibly in addition to voltage regulation of the last-mentioned kind.

In the embodiment shown in the drawing this positive or automatic voltage regulation is effected by means of the magnet 6. The winding 7 of the magnet 6 may be connected at X in the cathode lead to the high frequency rectifier valve 4, it being preferable however to bridge the winding for high frequency with a condenser.

If the current consumption on the high tension side increases, the magnetism of the said magnet also increases. Between the poles of this magnet there is provided a high frequency coil with a ferro-magnetic core, preferably a powder core, and owing to the varying magnetism the degree of pre-magnetisation of this high frequency coil, and with it its self-induction, alters.

Alteration of the high tension direct current flux thus brings about a change in the tuning of the anode circuit and, according to whether the set works on one side or the other of the resonance curve of the tuned secondary circuit, when the current flux in the high tension circuit increases, either the energy supplied to the secondary circuit is increased by equalisation of the mutual tuning of both circuits, so that the voltage remains constant even when the consumption of high tension current increases, or (when the set works on the other side of the resonance curve) the result may be achieved that, as withdrawal of current increases, the two circuits are progressively detuned, and this prevents the occurrence of a breakdown in an insulator cable or the like under test at the time.

Instead of a self-induction coil of this kind containing a pre-magnetisable core, there may also appropriately be employed any other current- or voltage-dependent tuning means such as are used for example in connection with the automatic sharp tuning of wireless sets, that is to say for example valves acting as capacitance or inductance.

The embodiment shown by way of example in the drawing is completed by a milliammeter MA provided in the high tension circuit, which indicates the insulation value and which may if desired be calibrated in ohms for certain voltages, and also, if desired, by a voltmeter V connected to the testing terminals directly or with the interposition of series resistances or the like, and designed to allow of reading off of the testing voltage or of observing the measuring range of the insulation testing instrument.

This instrument may conveniently be an electrostatic instrument, a glow discharge tube, tube voltmeter or the like.

Also for indicating the insulation current, that is to say instead of the milliammeter, there may be employed in the present instance glow discharge tubes, tube voltmeters or the like, since owing to the practically eliminated pulsation of the direct current there is no danger with these sets of errors in the measuring operation due to a capacitively transmitted alternating voltage.

Instead of for insulation testing, similarly constructed sets may also be employed for other purposes where it is desirable to generate high tension direct current with inexpensive means, e. g. for measuring or like purposes.

I claim:

1. In an apparatus of the class described, means for generating an alternating current wave of high frequency of the order of the range of radio frequencies, means for transforming said wave to a high potential high frequency current, means for rectifying said current, and means for controlling the high frequency alternating current in response to the rectified current consumption.

2. In an apparatus of the class described, means for generating an alternating current wave of high frequency of the order of the range of radio frequencies, means for transforming said wave to a high potential high frequency current, means for rectifying said current, means for filtering said current to smooth out the ripples therein to obtain a high potential direct current, and means for controlling the high radio frequency alternating current in response to the direct current output.

3. In an apparatus of the class described, means for generating an alternating current wave of high frequency of the order of the range of radio frequencies, means for transforming said wave to a high potential high frequency current, said high potential being of the order of several thousand volts, means for rectifying said current, and means for maintaining said high potential high frequency current substantially constant irrespective of variations in consumption of the rectified current.

4. In an apparatus of the class described, means for generating an alternating current wave of high frequency of the order of the range of radio frequencies, means for transforming said wave to a high potential high frequency current, said high potential being of the order of several thousand volts, means for rectifying said current, and means for reducing the potential of the high frequency current corresponding to an increase in consumption of the rectified current.

5. An apparatus as set forth in claim 1, wherein said last-mentioned means comprises a magnetizable element adapted to be variably affected by the rectified current, and adapted to modify said alternating current generating and transforming means.

6. The method of producing a direct current of high potential which comprises generating an alternating current wave of high frequency of the order of the range of radio frequencies, transforming said wave to a high potential high frequency current, said high potential being of the order of several thousand volts, rectifying said last mentioned current and controlling the high frequency alternating current in response to the rectified current consumption.

7. The method of producing a direct current of high potential which comprises generating an alternating current wave of high frequency of the order of the range of radio frequencies, transforming said wave to a high potential high frequency current, said high potential being of the order of several thousand volts, rectifying said last mentioned current, filtering said current to smooth out the ripples therein to obtain a high potential direct current, and controlling the high frequency alternating current in response to the direct current consumption.

8. Arrangement for producing testing voltages comprising a source of radio frequency alternating current, means for rectifying said alternating current, a tuned circuit controlling the transference of current to said rectifying means, output terminals fed from the output of said rectifier, and means dependent upon the rectified current consumed by the consumer connected to said terminals for producing a variation of the determining factors of said tuning circuit.

9. Arrangement for producing testing voltages of several thousand volts comprising a source of radio frequency alternating current, means for rectifying said alternating current, a tuned circuit controlling the transference of current to said rectifying means, output terminals fed from the output of said rectifier, and means for producing a variation of the determining factors of said tuned circuit in accordance with the current consumption of a consumer connected to said output terminals for maintaining the output voltage substantially constant irrespective of changes in the current consumption of said consumer.

10. Arrangement for producing testing voltages comprising a source of radio frequency alternating current, means for rectifying said alternating current, a tuned circuit controlling the transference of current to said rectifying means, output terminals fed from the output of said rectifier, and means for producing a variation in the determining factors of said tuned circuit in accordance with the current consumption of a consumer connected to said output terminals, for reducing the output voltage in the event of an increase in the current consumption of said consumer.

11. Device comprising a radio frequency generator, a tuned circuit associated with said radio frequency generator and controlling the frequency thereof, a transforming device, a tuned circuit associated with the secondary of said transforming device, means for rectifying the radio frequency current output from said transforming device, and means for varying the tuning of the tuned circuit associated with the radio frequency generator in accordance with the consumption of the direct current output from said rectifier.

12. Device according to claim 11, wherein the tuned circuit associated with the radio frequency generator comprises an inductance having a saturable core, means being provided for varying the saturation of said core in accordance with the changes in the consumption of the direct current output from the rectifier.

LEON LADISLAS DE KRAMOLIN.